United States Patent [19]
Jo et al.

[11] Patent Number: 5,684,662
[45] Date of Patent: Nov. 4, 1997

[54] DRIVING APPARATUS FOR STABILIZING OPERATION OF AN EXTENSIBLE-RETRACTABLE POWER ANTENNA

[75] Inventors: Hyun-min Jo, Puchon; Yong-ho Kim, Seoul, both of Rep. of Korea

[73] Assignee: Samsung Electronics Co., Ltd., Suwon, Rep. of Korea

[21] Appl. No.: 580,883

[22] Filed: Dec. 29, 1995

[30] Foreign Application Priority Data

Dec. 30, 1994 [KR] Rep. of Korea .................. 94-39689

[51] Int. Cl.⁶ .................................................. H02H 5/04
[52] U.S. Cl. ........................ 361/28; 361/31; 318/650; 388/916
[58] Field of Search ................... 361/23, 31, 28; 318/466–469, 445–449, 650; 388/815, 916

[56] References Cited

U.S. PATENT DOCUMENTS

| | | | |
|---|---|---|---|
| 4,140,952 | 2/1979 | Miller | 318/478 |
| 4,203,059 | 5/1980 | Kraus | 318/446 |
| 4,950,091 | 8/1990 | Harada | 388/815 |

*Primary Examiner*—Jeffrey A. Gaffin
*Assistant Examiner*—Michael J. Sherry
*Attorney, Agent, or Firm*—Cushman Darby & Cushman, IP Group of Pillsbury Madison & Sutro LLP

[57] ABSTRACT

The driving apparatus for a power antenna, e.g. an extensible-retractable automotive radio antenna, is provided with stability function which controls the operation of the motor driving the power antenna until the power antenna is varied into a state for performing normal operation, and provides hysteresis to prevent a state of the controlling signal from being varied too often by a voltage drop generated in rotation of the motor.

16 Claims, 6 Drawing Sheets

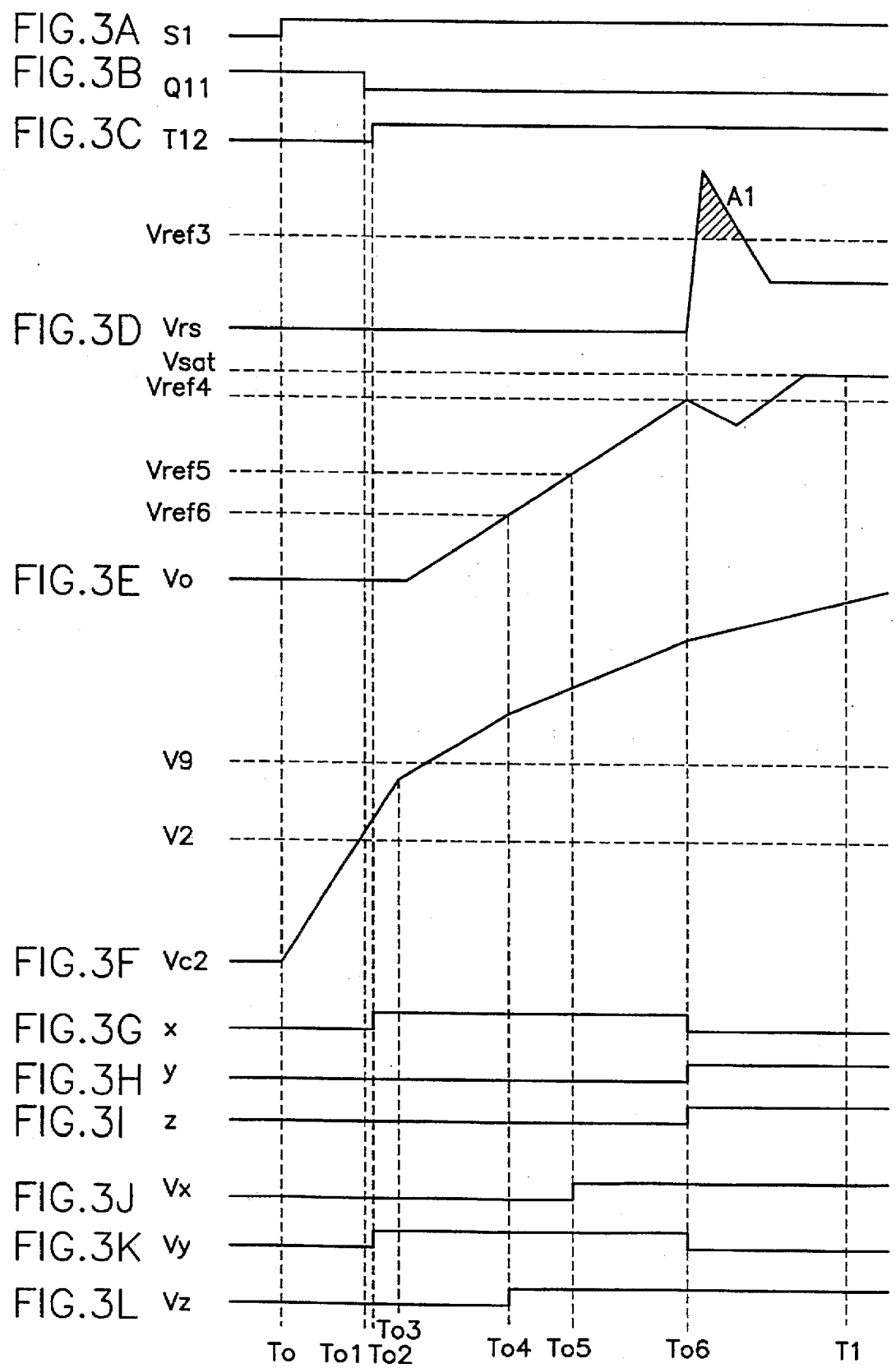

DRIVING APPARATUS FOR STABILIZING OPERATION OF AN EXTENSIBLE-RETRACTABLE POWER ANTENNA

BACKGROUND OF THE INVENTION

(1) Field of the Invention

The present invention relates to an apparatus for driving a power antenna and providing the antenna with a stability function, and more particularly, to an apparatus which provides a stabilizing function in driving a power antenna, such as a raisable and lowerable antenna for an automatic radio, by preventing incorrect operation caused by errors in an operation time required to return the power antenna to a normal state, by applying a stabilized power for operation of the antenna.

(2) Description of the Prior Art

A typical power antenna system is constructed to perform a raising/lowering operation by normal/reverse rotation of a motor, respectively as activated by a driving switch for the antenna.

Accordingly, a prior art antenna system performing a raising/lowering operation according to the rotation of a motor, varies the raising/lowering speed in accordance with a driving voltage value or the antenna state. Particularly, when the antenna is aged or bent, the raising/lowering speed of the antenna is substantially different from that in the normal state.

Therefore, when driving the switch of a prior art antenna, enough raising/lowering time of the antenna is required so that, if the driving voltage of the antenna is too low or the state of the antenna is abnormal, the antenna system can the antenna to a set point correctly. For example to rotate the motor enough for a stabilized raising/lowering operation of the antenna, sometime more time is needed for the motor to be rotated continuously than in a normal state, even after the raising/lowering operation is finished. However, when applying a driving signal to an antenna drive motor after the raising/lowering operation of the antenna is finished, the motor is locked mechanically, so that an overload is applied to the motor thereby causing a burnout or other damage to the motor.

The prior art power antenna driving apparatus, as illustrated in FIG. 4, supplies an overload voltage to an integrator, and is structured to control the rotating operation of a motor, and adjust the operation of the power antenna, only if the integrated overload exceeds a set value. Accordingly, for an overload voltage generated from noise during a normal operation, the invention prevents incorrect operation by stopping which stops the motor-rotation which controls the operation of the power antenna, by being operated to a positive direction. If an outputted voltage reduced with a slope corresponding to the integrated overload satisfies the set conditions, the driving time of the motor is adjusted by varying a charging/discharging time of a capacitor, and the rotating operation of the motor for raising/lowering of the antenna is stopped.

The invention protects the motor by stopping the rotation of the motor to prevent overload from applying to the motor, only when the integrated overload exceed the set value. If the integrated overload is below the set point, the rotating operation of the motor is performed normally.

The invention makes an outputted voltage of an operation amplifier Q41 of an overload protecting unit 40 a low level L, after turning on the driving switch S1, which performs an integration until the overload protecting unit 40 returns to the normal state which starts to operate after the reference voltage Vref outputted from a reference voltage generating unit 12 is applied. Consequently, an output state of an AND gate AND 51 of the overload protecting unit 40 becomes a high level H, from an outputted voltage of the operation amplifier Q41 of the overload protecting unit 40 and the driving signal of the antenna S1, so that the transistors T53, T51 are turned on in series.

Hence, the charging time of the capacitor C21 of a timer unit 20 is varied, which determines the rising time of the power antenna. That is, in a normal state, the charging time of the capacitor C21 of the timer unit 20 is set to of (R21+R22)*C21, but in this case, the charging voltage of the capacitor C21 is increased suddenly with the rectified number of (R51*C21) in accordance with an incorrect signal output from the operational amplifier Q41 of the overload protecting unit 40. Accordingly, since the charging operation of the capacitor C21 of the timer unit 20 is not operated normally until the operational state of the overload protecting unit 40 is returned to the normal state, the maximum operation time of the motor M, which is set as the charging time of the capacitor C21, is reduced. Consequently, in the prior art driving apparatus for a power antenna, a problem occurs wherein the motor operation is not performed normally after the driving switch of antenna S1 is operated.

SUMMARY OF THE INVENTION

An object of the present invention is to solve the problems of the prior art and to provide a driving apparatus of a power antenna with a stabilizing function which can control the operation of a motor driving a power antenna until the power antenna is returned to a normal operation, and gives a hysteresis to prevent the state of the controlling signal from being varied too often by a voltage drop generated during rotation of the motor.

The present invention, to solve the prior art problem, comprises an antenna driving switch which actuates the antenna by varying an operational state in accordance with a request by a user; a power supplying unit which provides a reference voltage and a driving voltage needed to operate a circuit according to the operation of the motor; a timer means which fixes a motor operation time according to the charging/discharging of the capacitor with respect to the operating state of the antenna driving switch, connected with the antenna driving switch; a motor driving means which controls the operation of the motor by a varied operational state by a controlling signal applied in accordance with the time fixed by the timer means, this motor driving means being connected with the timer means; an overload preventing means which outputs a controlling signal for stopping an operational rotating motor, in case an overload is applied to the motor, by performing an integration and then finding that the integration result is above a fixed value, this overload preventing means being connected with the motor driving means; a latching unit which controls the rotation of the motor by controlling the operational state of the motor driving means in accordance with the applied signal from the overload protecting means, this latching unit being connected with the overload protecting means; and a time resetting unit which stops rotation of the motor over again by varying the charging/discharging time of the timer means according to the state of the applied signal from the latching unit, this time resetting unit being connected with the latching unit.

BRIEF DESCRIPTION OF THE DRAWINGS

FIGS. 3A–3L are graphical plots of an operational timing diagram for the power antenna driving means of FIG. 1.

DETAILED DESCRIPTION OF THE PREFERRED EMBODIMENTS

With reference to the drawings, a preferred embodiment of the invention is described below.

Figure 1:
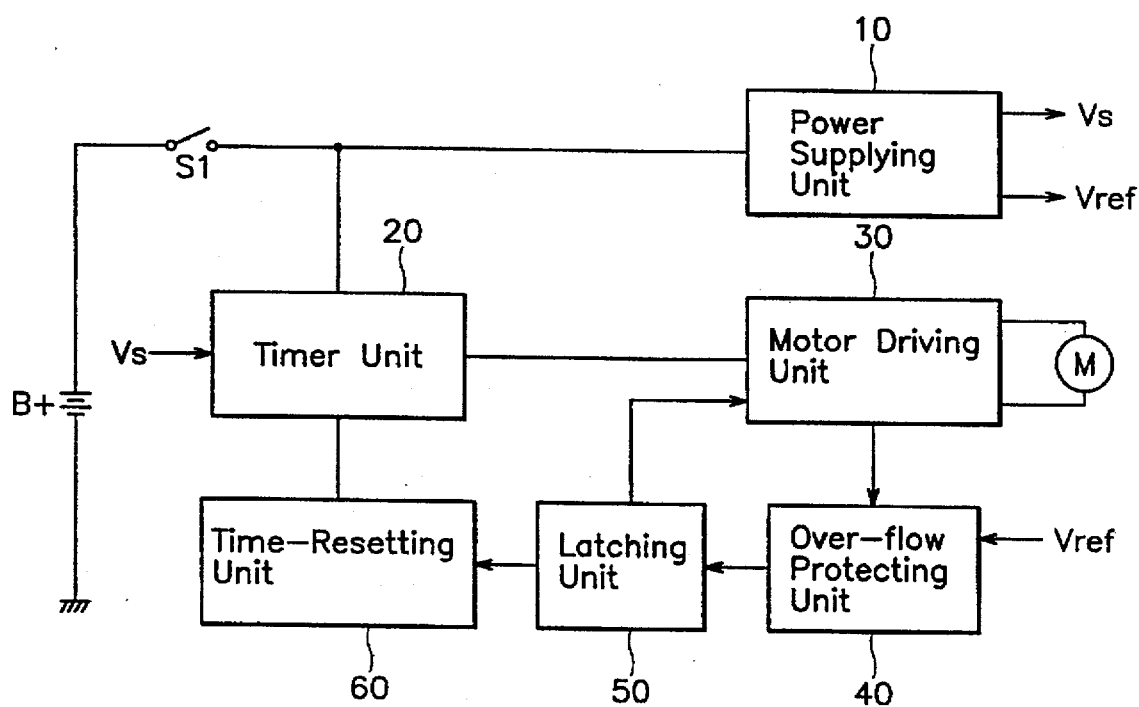
FIG. 1 is a block diagram of a driving means which provides an extensible-retractable power antenna with a stability function, according to a preferred embodiment of the invention.

As illustrated in FIG. 1, the apparatus of the preferred embodiment of the present invention comprises a driving switch S1 of which operational state is varied by a user for driving the power antenna, e.g. to raise or lower the antenna. The switch S1 is connected to a power source $B^+$; The apparatus further includes a motor M performing a rotation for raising or lowering the power antenna, by an applied driving signal varied according to the operational state of the antenna driving switch S1; a power supplying unit 10 controlling the output state of the reference voltage Vref and the driving voltage needed for operation according to the operation of the power antenna or the state of the power supply $B^+$, connected with the power supply $B^+$; a timer unit 20 setting an operational time for the motor M according to the operational state of the antenna driving switch S1, connected to the power antenna driving switch S1; a motor driving unit 30 controlling the state of the power applied to the motor M according to the operational state or the output state of the timer unit 20, connected to the timer unit 20; an overload protecting unit 40 sensing an overload state of the motor M by integrating the overloaded power maintaining a higher level than the reference point of the power flowing to the motor M when the motor is operated, connected to the motor driving unit 30; a latching unit 50 controlling the rotation of the motor M when a higher level overload power is applied than the reference point to the motor M, connected with the overload protecting means 40; and a time resetting unit 60 resetting the applied operational time of the motor, to the motor M, by varying the charging/discharging time of the timer means according to the state of the applied signal from the latching unit, connected with the latching unit for stopping rotation of the motor over again, and outputting a signal.

Figure 2:
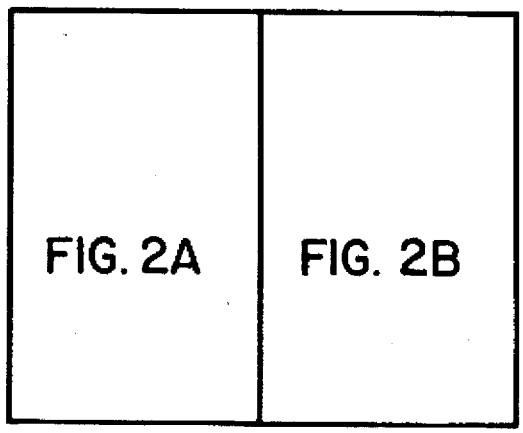
FIG. 2 is a detailed circuit diagram of the power antenna driving means of FIG. 1.
Figure 2A:
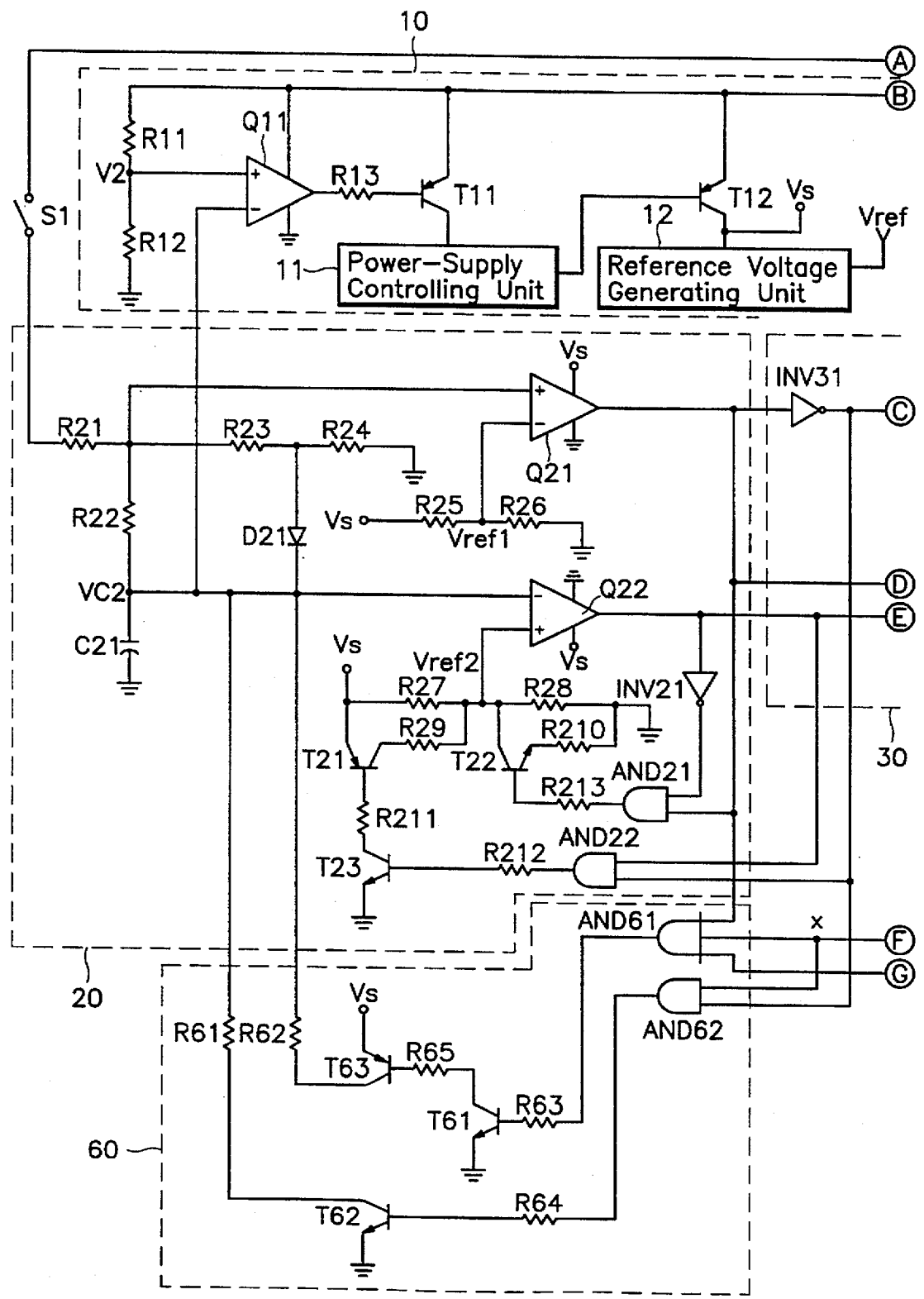
Figure 2B:
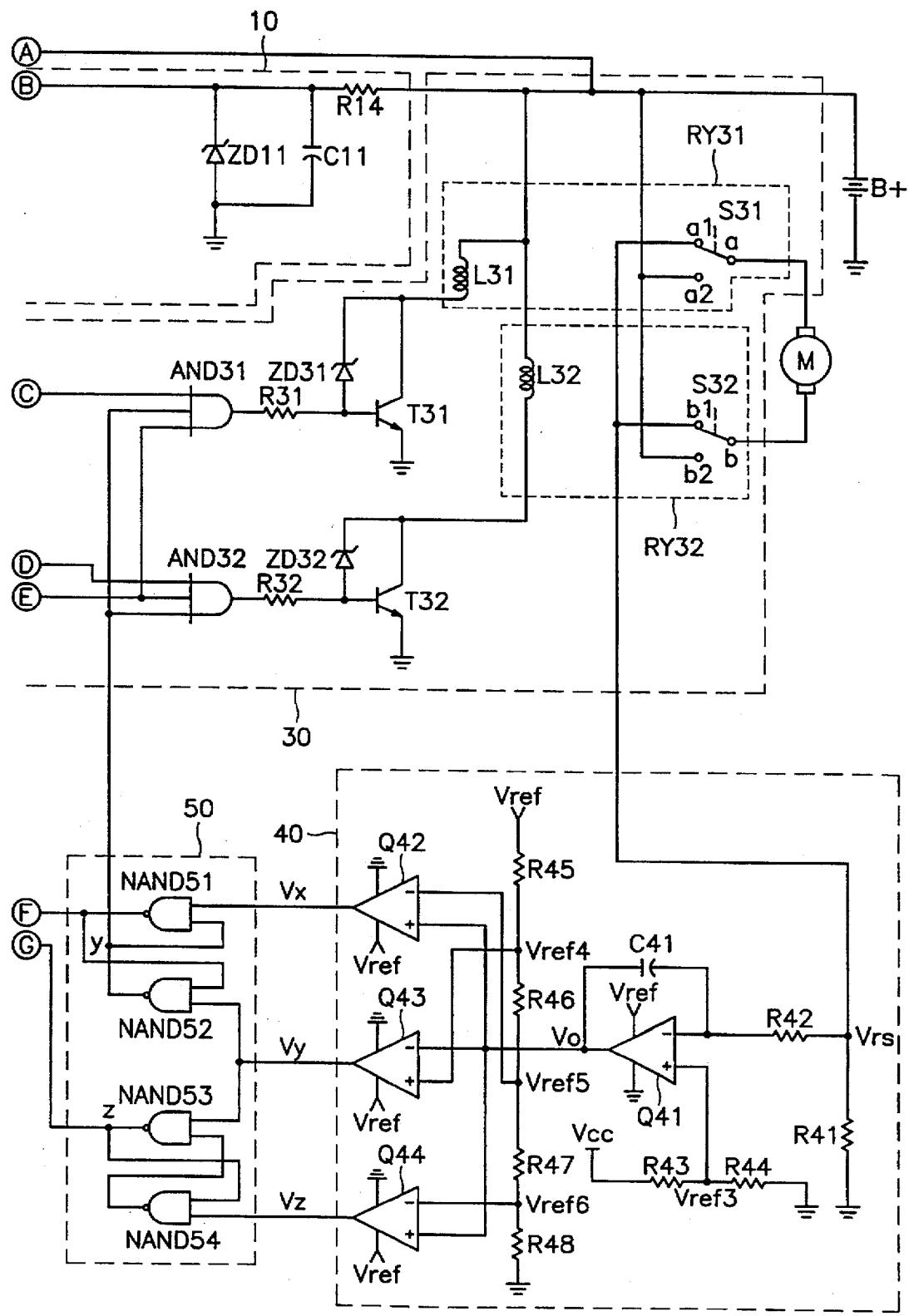
Figure 4:
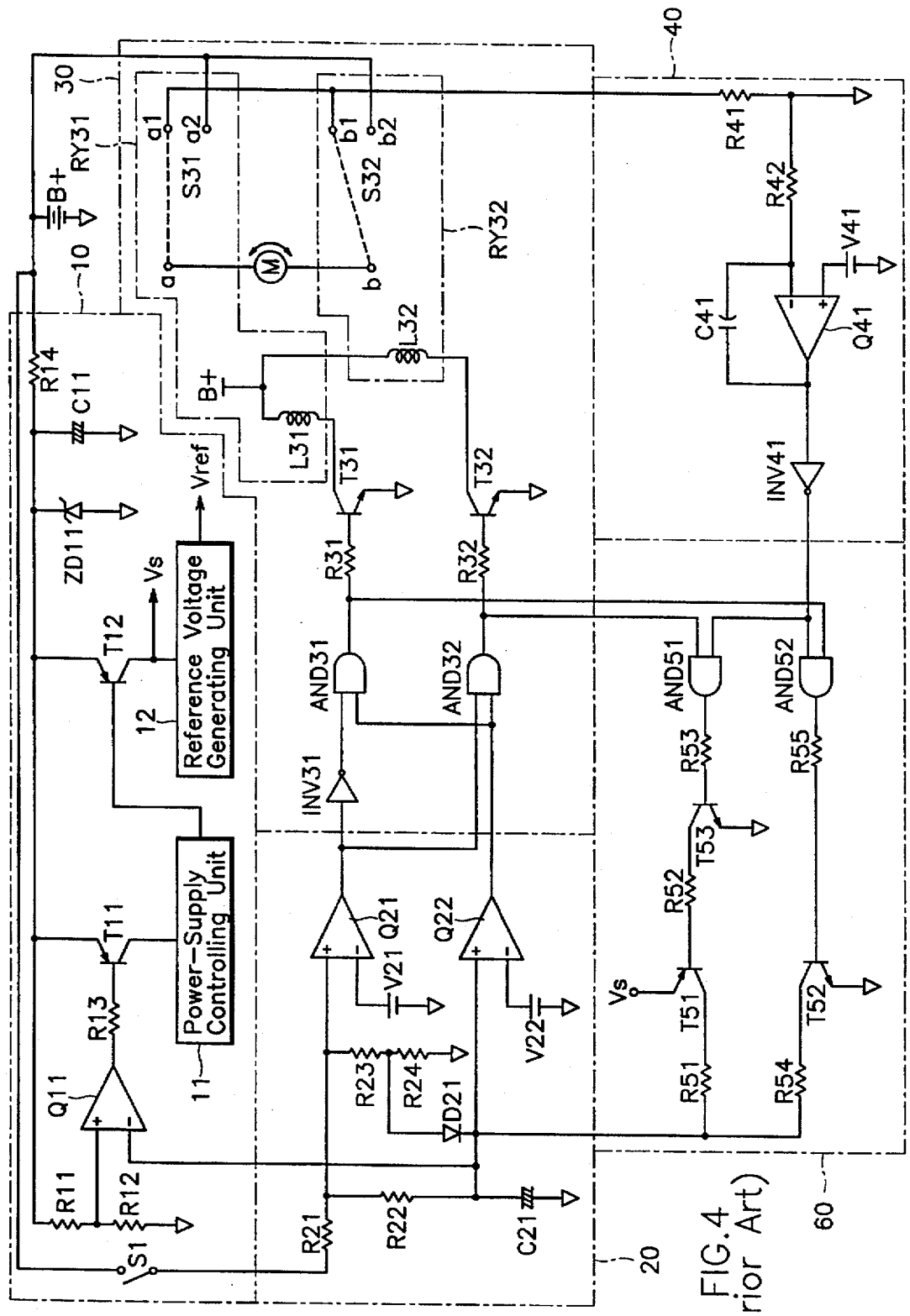
FIG. 4 is a detailed circuit diagram of a prior art power antenna driving means.

As shown in FIGS. 2A and 2B, the power supplying unit 10 includes a resistor R14 having one terminal connected to the power source $B^+$, a capacitor C11 having one terminal connected to another to a terminal of the resistor R14 and another ground terminal, a Zener-diode ZD11 having a cathode terminal connected to another terminal of the resistor R11 and a grounded anode terminal, a resistor R11 having one terminal connected to another terminal of the resistor R14, a resistor R12 having one terminal of resistor R11 connected to another terminal and another terminal grounded, a comparator Q11 having a non-inverse terminal connected to another terminal of the resistor R12, a resistor R13 having one terminal connected to an output terminal of the comparator Q11, a transistor T11 having a base terminal connected to another terminal of the resistor R13 and having an emitter terminal connected to another terminal of the resistor R14, a power supply controlling unit 11 connected to a collector terminal of the transistor T11, a transistor T12 having an emitter terminal connected to another terminal of the resistor R14 and having a base terminal connected to the output terminal of the power supply controlling unit 11, and a reference voltage generating unit 12 connected to the collector terminal of the transistor T12.

The timer unit 20 includes a resistor R21 having one terminal connected to another terminal of an antenna driving switch S1, a resistor R22 having one terminal connected to another terminal of the resistor R21, a capacitor C21 having one terminal connected to another terminal of the resistor R22 and another terminal grounded, a resistor R23 having one terminal connected to another terminal of the resistor R21, a resistor R24 having one terminal connected to another terminal of the resistor R23, a diode D21 having an anode terminal connected to another terminal of the resistor R23 and a cathode terminal connected to one terminal of the capacitor C21, a comparator Q21 having a non-inverse terminal connected to one terminal of the resistor R23, a resistor R25 having one terminal connected to a driving voltage Vs of the power supplying unit 10, a comparator Q22 having an inverse terminal connected to one terminal of the capacitor C21, a resistor R27 having one terminal connected to a driving voltage Vs of the power supplying unit 10 and another terminal connected to a non-inverse terminal of the comparator Q22, a resistor R28 having one terminal connected to another terminal of the resistor R27 and another terminal grounded, a transistor T21 having an emitter terminal connected to the driving voltage Vs of the power supplying unit 10, a resistor R211 having one terminal connected to the base terminal of the transistor T21, a transistor T23 having a collector terminal connected to another terminal of the resistor R211 and a grounded emitter terminal, a resistor R29 having one terminal connected to the collector terminal of the transistor T21 and another terminal connected to another terminal of the resistor R27, a transistor T22 having a collector terminal connected to another terminal of the resistor R27, a resistor R210 having one terminal connected to an emitter terminal of the transistor T22 and another terminal is grounded, a resistor R213 having one terminal connected to the base terminal of the transistor T22, a resistor R212 having one terminal connected to the base terminal of the transistor T23, an inverter INV21 having an input terminal connected to the output terminal of the comparator Q22, an AND gate AND21 having one terminal connected to the output terminal of the inverter INV21 and another terminal connected to the comparator Q21, and an AND gate AND22 having one terminal connected to the output terminal of the comparator Q22 and an output terminal connected to another terminal of the resistor R212.

The motor driving unit 30 includes an inverter INV31 having an input terminal connected to an output terminal of an operational amplifier Q21 of the timer unit 20, an AND gate AND31 having a first input terminal connected to an output terminal of the inverter INV31 and a second input terminal connected to an output terminal of the comparator Q22, an AND gate AND 32 having a first input terminal connected to an output terminal of the comparator Q21 of the timer unit 20 and a second terminal connected to an output terminal of the comparator Q22, a resistor R31 having one terminal connected to an output terminal of the AND gate AND31, a resistor R32 having one terminal connected to an output terminal of the AND gate AND32, a Zener-diode ZD31 having an anode terminal connected to another terminal of the resistor R32, a Zener-diode ZD32 having an anode terminal connected to another terminal of the resistor R32, a transistor T31 having a base terminal connected to another terminal of the resistor R31 and a grounded emitter terminal, a transistor T32 having a base terminal connected to another terminal of the resistor R32 and a grounded emitter terminal, a first relay RY31 connected to a power $B^+$ and a collector terminal of the transistor T31, and a second relay RY32 connected to a power B⁺ and a collector terminal of the transistor T32.

A first relay RY31 includes a coil L31 having one terminal connected to the power supply B⁺ and another terminal connected to the collector terminal of the transistor T31, and a switch S31 having a fixed terminal connected to the motor M and a second terminal a a2 connected to the power supply B⁺.

A second relay Ry32 includes a coil L32 having one terminal connected to the power supply B⁺ and another terminal connected to the collector terminal of the transistor T32, and switch S32 having a fixed terminal b connected to the motor M and a second terminal b2 connected to the power supply B⁺.

The overload protecting unit 40 includes a resistor R41 having one terminal connected to first terminals a1, b1 of the switches S31, S32 of first and second relays Ry31, Ry32 of the motor driving unit 30 and another terminal grounded, a resistor R42 having one terminal connected to one terminal of the resistor R41, a resistor R43 having one terminal connected to power Vcc, a resistor R44 having one terminal connected to another terminal of the resistor R43 and another terminal grounded, an operational amplifier Q41 having an inverse terminal connected to another terminal of the resistor R42 and a non-inverse terminal connected to another terminal of the resistor R43, a capacitor C41 having one terminal connected to the inverse terminal of the operational amplifier Q41 and another terminal connected to its output terminal, a resistor R45 having one terminal connected to a reference voltage Vref of the power supplying unit 10, a resistor R46 having one terminal connected to another terminal of the resistor R45, a resistor R47 having one terminal connected to another terminal of the resistor R46, a resistor R48 having one terminal connected to another terminal of the resistor R47 and another terminal grounded, a comparator Q42 having an inverse terminal connected to one terminal of the resistor R47 and a non-inverse terminal connected to an output terminal of the operational amplifier Q41, a comparator Q43 having a non-inverse terminal connected to one terminal of the resistor R46 and an inverse terminal connected to an output terminal of the operational amplifier Q41, and a comparator Q44 having an inverse terminal connected to one terminal of the resistor R48 and a non-inverse terminal connected to an output terminal of the operational amplifier Q41.

The latching unit 50 includes a NAND gate NAND51 having one terminal connected to the output terminal of the operational amplifier Q42 of the overload protecting unit 40, a NAND gate NAND 52 having one terminal connected to an output terminal of the comparator Q43 of the overload protecting unit 40 and an output terminal connected to another terminal of the NAND gate NAND51 and an output terminal connected to an input terminal of AND gates AND31 and AND32 of the motor driving unit 30, a NAND gate NAND53 having one terminal connected to an output terminal of the comparator Q43 of the overload protecting unit 40, and a NAND gate NAND54 having one input terminal connected to an output terminal of the comparator Q44 of the overload protecting unit 40 and another input terminal connected to an output terminal of the NAND gate NAND 53.

The timer resetting unit 60 includes resistors R61, R62 having one terminal connected to one terminal of the capacitor C21 of the timer unit 20, an AND gate AND61 having a first input terminal connected to an output terminal of the comparator Q21 of the timer unit 20, a second input terminal connected to an output terminal of the NAND gate NAND51 of the latching unit 50 and a third input terminal connected to an output terminal of the NAND gate NAND53 of the latching unit 50, an AND gate AND62 having one input terminal connected to an output terminal of the NAND gate NAND51 of the latching unit and another input terminal connected to an output terminal of the inverter INV31 of the motor driving unit 30, a resistor R63 having one terminal connected to the output terminal of the AND gate AND61, a resistor R64 having one terminal connected to the output terminal of the AND gate AND62, a transistor T61 having a base terminal connected to another terminal of the resistor R63 and a grounded emitter terminal, a transistor T62 having a base terminal connected to another terminal of the resistor R64, a grounded emitter terminal and a collector terminal connected to another terminal of the resistor R61, and a transistor T63 having an emitter terminal connected to the driving voltage Vs of the power supplying unit 10, a base terminal connected to another terminal of the resistor R65 and a collector terminal connected to another terminal of the resistor R62.

Operation of the present invention is described below.

Firstly, a raising (extension) operation of the antenna performed in a power-on state of the antenna driving switch S1, is described hereinafter.

As illustrated in FIG. 3A, when the antenna driving switch S1 is turned on by a user, as the power from power supply B⁺ flows through the resistors R21, R23 and R24 of the timer unit 20 through the antenna driving switch S1 turned on by To3 of FIG. 3F, charging operation to the capacitor C21 through the diode D21 is increased abruptly, until the value from which an on-voltage of the diode D21 is deducted so that after To3, a time constant of (R21×R22) ×C2 is increased and makes the same graph as as shown in FIG. 3F.

Therefore, once a charging voltage Vc2 of the capacitor C21 of the timer unit 20 is at a higher level than a reference voltage divided by the resistors R11 and R12 of the power supplying unit 10, the output state of the comparator Q11 is at a low level as shown in FIG. 3B, and the transistor T11 is turned on. And, once the power at B⁺ is applied to the power supply controlling unit 11 by turning-on the transistor T11, the power supply controlling unit 11 starts operating. If the power supply controlling unit 11 detects the state of the power B⁺ is below a fixed level, it cuts off the power needed for operation and prevents incorrect operation due to an unstable power at B⁺.

After the required power at B⁺ is applied to the power supply controlling unit 11, the power supply controlling unit outputs a low level signal L to the base terminal of the transistor T12 in the normal state of the power at B⁺ and turns on the transistor T12. After the power at B⁺ is applied to the reference voltage generating unit 12, the reference voltage Vref and the driving voltage Vs needed for the operation of the circuit are applied to the corresponding devices, and the extension/retraction operation of the antenna is allowed to be controlled. While a charging operation of the capacitor C11 of the timer unit 20 is performed according to the power-on state of the antenna driving switch S1, by the operation of the power supplying unit 10, the output states of the comparators Q21, Q22 of the timer unit 20 become a high level H. The output state of the comparator Q43 of the overload protecting unit maintains a high level H, up to To6, as shown in FIG. 3K. And then NAND gate NAND52 of the latching unit 50 maintains an output state at a low level L and outputs to the AND gates AND31, AND32 of the motor driving unit 30. Therefore, there is no rotation of the motor M, regardless of to the state of the timer unit 20. When at To2 a reference voltage Vref or a driving voltage Vs needed for operation is applied, an output state of the comparators Q42, Q44 of the overload protecting unit 40 are a low level L according to the output voltage Vo of the comparator Q41 and the fixed reference voltages Vref5 and Vref6. Accordingly, the output state of the NAND gate NAND53 of the latching unit 50 is at a low level L, outputted to the time resetting unit 60 and turns off the operation of the time resetting unit 60.

Accordingly, incorrect operation of the motor M, which would occur for an overload as a peak power flow generated abruptly when the reference voltage Vref or the driving voltage Vs is applied, can be prevented. After the operation of the antenna driving switch S1 starts, the operation of the motor M can be stopped by an output signal of the latching unit 50 to prevent incorrect operation of the motor M. As rotation of the motor M does not occur, the voltage of the power flowing through the motor M maintains a low level L as shown in FIG. 3D and the output voltage Vo of the operational amplifier Q41 of the overload protecting unit 40 is increased, as illustrated in FIG. 3E. However, when the output voltage Vo of the operational amplifier Q41 of the overload protecting unit 40 becomes the same as the reference voltages Vref6, Vref5, that is in To4 to To5, so that the output states of the comparators Q42, and Q44 are high-level, the output states of the NAND gates NAND52, NAND53 are stable and continually vary the operational state of the motor driving unit 30 and the time resetting unit 60 at a turn-off state. Therefore, after the antenna driving switch S1 is turned on as described above, until the output voltage Vo of the overload protecting unit 40 becomes the same point of time To6 as the reference voltage Vref4, which is prior to reaching the saturated voltage Vsat of the operational amplifier Q41, the operation of the motor driving unit 30 and the time resetting unit 60 are shut down, so that rotation of the motor M is prevented until the circuit is stable.

However, at the point of time To6 that the output voltage Vo of the operational amplifier Q41 becomes the reference voltage Vref4, the output state of the comparator Q43 is varied to a low level L, and the output states of the NAND gates NAND52, NAND53 of the latching unit 50 are varied to a high-level. Thus, the motor driving unit 30 and the time resetting unit 60 are varied to an operational state, which is suitable for the state of the motor M.

Once the output state of the NAND gate NAND52 of the latching unit 50 is varied at a high level H to release the output state of the AND gate AND32 of the motor driving unit 30, the output states of the comparators Q21, Q22 maintain a high-level by charging operation of the capacitor C21 of the timer unit 20 in accordance with the operation of turning-on of the antenna driving switch S1, with the result that the AND gate AND32 of the motor driving unit 30 is at a high-level. Accordingly, the transistor T32 of the motor driving unit 30 is turned on by the signal applied through the resistor R32. By the operation of turning-on of the transistor T32, the power at $B^+$ flows to a coil L31 of the second relay Ry31 and operates the second relay RY31, following that the connection state of the switch S32 of the second relay RY32 is varied to a second terminal b2. As the power at $B^+$ flowing through the motor M flows via the second relay RY32 to the first terminal a1 of the switch S31 and the first relay RY31, the motor rotates in a positive direction, thus raising (extending) the antenna. After that step, if a charging voltage of the capacitor C21 is higher than the reference Vref2 of the comparator Q22 by the charging operation of the capacitor C21 of the timer unit 20, the output voltage of the comparator Q22 is varied to a low level L, and the output signal of the AND gate AND32 is varied from a high level to a low level so that the transistor T32 in a turn-on state, is turned off.

The operational second relay Ry32 operated by the operation of the transistor T32 is at a non-operational state and varies the connection state of the switch S32 of the second relay RY32 to the first terminal a1. Consequently, the power at $B^+$ applied to the motor is shut down so that the rotation of the motor is stopped.

At this time, as the output state of the comparator Q21 sustains the high level, the transistor T31 maintains the turn-off state regardless of the state of the comparator Q22, and the state of the first relay RY31 is not varied.

Secondly, the operation of retracting the extended antenna while varying the antenna driving switch S1 from a turn-on state to a turn-off state is described below.

Once the antenna driving switch S1 is turned off, electric charge of the capacitor C21 of the timer unit 20 is emitted, with a time constant fixed through the resistors R22 to R24.

When the voltage of the non-inverse terminal of the comparator Q21 of the timer unit 20 is lower than the reference voltage Vref2 fixed by the resistors R25, R26, by the discharging operation of the capacitor C21, the output state of the operational amplifier Q21 is varied to a low level L and a high-level signal H is applied to the first input terminal of the AND gate AND31 via the inverter INV31 of the motor driving unit 30. As the voltage applied to the inverse terminal of the comparator Q22 is not higher than the reference voltage Vref2, the output signal of the comparator Q22 is at a high level H. Additionally, the NAND gate NAND52 of the latching unit 50 suspends a high-level state by the low level signal of the comparator Q43. In accordance with the output states of the comparators Q21, Q22, an output state of the AND gate AND32 suspends a low level L so that a transistor T31 is varied to a turn-on state.

As the power $B^+$ flows through the coil L31 of the first relay RY31 and the transistor T31 by the turn-on operation of the transistor T31, the state of the first relay RY31 is varied to the operational state so that the connection state of the switch S31 is varied to the second terminal a2. Therefore, the power at $B^+$ is applied to the motor M through the switch S21 of the first relay RY21, flows via the second relay Ry32 in a non-operational state with the connection with the first terminal a1 followed by a reverse rotation of motor M that telescopically retracts the protruding antenna.

When the discharging operation of the capacitor C21 reaches the fixed time, the output state of the comparator Q11 is varied to a high-level H because the state of the signal applied to the non-inverse terminal of the comparator Q11 of the power supplying unit 10 is lower than the reference voltage V2 fixed by the resistors R11, R12 so that the output state of the comparator Q11 is varied to a high-level. Accordingly, as the transistor T11 of the power supplying unit is varied to the state of turning-off, thereby stopping the operation of the power supplying unit 11, the power needed to operate the power supply controlling unit 11 is cut off and the operation of the transistor T12 and the reference voltage generating unit 12 are stopped.

Because the reference voltage Vref and the driving voltage Vs are cut off as described above, rotation of the motor M is stopped. During the fixed time which is set according to the charging/discharging time of the capacitor C21 of the timer unit 20, the rotation of the motor causes extension/ retraction operation. In case of turning on the corresponding transistors T31, T32 of the motor driving unit 30 for extension/retraction operation of the motor M, the power flowing through the resistor R14 of the power supplying unit 10 is decreased during the power consumption for the turn-on operation and a voltage drop occurs. Consequently, due to the decreased driving voltage, the reference voltage Vref2 of the comparator Q22 of the timer unit is decreased and the output state of the comparator Q22 becomes unstable.

Therefore, the first and the second relays RY31, RY32 for driving the motor M have frequent power on/off operation due to unstable voltage charge, thus resulting in reduced durability of the relays Ry31, RY32.

To solve the above-mentioned problems, the corresponding transistors T22, T23 should be turned on as the output signals of the AND gates AND21, AND22 are varied in accordance with the output state of the comparator Q22, thus leading to stabilization of the output signal of the comparator Q22 for adjusting the corresponding hysteresis when the output signal of the comparator Q22 is varied.

When the motor M rotates in its forward/reverse directions, the power corresponding to the voltage applied to the motor M flows, as shown in FIG. 3D through the resistor R41 of the overload protecting unit 40. And when a raising/lowering operation of the antenna is not performed normally during the charging/discharging time of the capacitor C21 of the timer unit 20, a peak power, one of the overload powers, with the impact of noise, is until an overload is applied due to locking of the motor M or the driving operation of the antenna becomes stable.

Once an overload which is above the reference voltage Vref3 of the overload protecting unit 40 is applied as at To6, the operational amplifier Q41 of the overload protecting unit 40 performs an integration to the voltage applied through the resistor R42, and decreases the output voltage Vo of the operational amplifier Q41 after discharging the corresponding power. The output voltage Vo of the operational amplifier Q41 decreases with a slope in proportion to the size A1 of the overload applied by the integration, as shown in FIG. 3E. As the output state of the operational amplifier Q41 decreased by the integration is determined in accordance with the overloaded area A1 flowing through the resistor R41 of the overload protecting unit 40, the output state of the operation amplifier Q41 of the overload protecting unit 40 is at a low level L in case the area of the applied power is above a fixed size.

When the output state of the operational amplifier Q41 is at a low level L, the comparator Q42 outputs the low level signal L and the output state of the comparators Q43, Q44 suspends the state of a high level. According to the output states of the comparators Q42, Q43, and Q44, a high level signal H is outputted to the NAND gates NAND51, NAND53 of the latching unit 50, and an output signal of the NAND gate NAND52 suspends a low level L. When an overload is applied while the motor M rotates in forward/reverse direction to extend/retract the antenna, the output states of AND gates AND32, AND31 of the motor driving unit 30 are varied to a low level L by the output signal of the NAND gate NAND52 of the latching unit 50, further leading to stopping of the rotating motor M. As the output state of the AND gate AND61 of the time resetting unit 60 is varied to a high-level H in accordance with the output signal of the NAND gates NAND51, NAND53 of the latching unit 50, the transistors T61, T63 are turned on serially, and charge the corresponding electronic charge to the capacitor C21 of the timer unit 20. And then, the output state of the comparator Q22 of the timer unit 20 is varied to a low level L and enables the AND gate AND32 of the motor driving unit 30 to output a low level signal stably. Once an overload signal above the fixed size is applied to the motor M, after stopping the rotation of the motor M performing antenna extension/retraction by the operation of the latching unit 50, a controlling signal can be outputted to stop the rotation of the motor M by the operation of the timer unit 20 by controlling the charging time of the capacitor C21 with the resistor R62 of the time resetting unit 60 having a high resistance value. After the rotation of the motor M according to the controlling signal which is applied from the latching unit 50 by applying the overload during the reverse rotation of the motor M to lower(retract) the antenna, the output state of the AND gate AND62 of the time resetting unit 60 is varied from a low level to a high level. As turning on of the transistor T62 varies the discharging time, the voltage applied to the inverse terminal of the comparator Q11 of the power supplying unit 10 reduces the decreasing time which is below the reference voltage V2. Subsequently, the output state of the comparator Q11 of the power supplying unit 10 is varied from the previous low level to a high level, and the transistor T31 is turned off. Thus stopped operation of the power supply controlling unit 30, followed by stopping of the voltage outputs VRef, Vs needed to operate the circuit, reduces subsequently waste of unnecessary power consumed in non-operation.

The present invention has the effect of preventing incorrect operation of the motor M caused by incorrect signals due to the unstable state of the circuit by stopping the operation of the motor M until the operational state of the overload sensing unit outputting the corresponding signal is returned to the normal state.

If an overload is applied to the motor M, the rotation of the motor is stopped by the operation of the latching unit, and the stable controlling operation of the motor is ensured by the output of the controlling signal which can stop the rotation of the motor according to the charging/discharging operation of the timer unit. And then, by giving a hysteresis of the controlling signal for controlling the operation of the motor M, and preventing the state change of the controlling signal due to an unstable voltage change therewith, the durability of the switching element controlling the rotation of the motor M is extended.

What is claimed is:

1. A driving apparatus of a power antenna with a stability function, comprising:

an antenna driving switch which drives the antenna by varying an operational state in accordance with selection by a user;

a motor;

a power supplying circuit which provides a reference voltage and a driving voltage needed for operation of the motor;

a timer which fixes an operation time for the motor according to the charging/discharging of a capacitor thereof, with respect to the operational state of the antenna driving switch, the timer being operatively connected with the antenna driving switch;

a motor driving circuit which controls the operation of the motor by setting a driving state in accordance with the operation time fixed by the timer, the motor driving circuit being operatively connected with the timer and with the motor;

an overload preventing circuit which outputs an overload signal for stopping operation of the motor when the motor is rotating, in case an overload is applied to the motor, by performing an integration and then finding that an integration result is above a fixed value, the overload preventing circuit being operatively connected with the motor driving circuit;

a latching circuit which controls the driving state of the motor driving circuit in accordance with the overload signal from the overload protecting circuit, the latching circuit being operatively connected with the overload protecting circuit; and a time-resetting circuit which varies the charging/discharging time of the timer according to the overload signal from the overload protecting circuit, the time-resetting circuit being operatively connected with the overload protecting circuit.

2. The driving apparatus of a power antenna with stability function as defined in claim 1, wherein the power supplying circuit is arranged for minimizing power consumption by controlling the state of the power source applied to the power supply controlling circuit by varying an operational state of a comparator thereof according to the operational state of the antenna driving switch and a voltage of the capacitor of the timer.

3. The driving apparatus of a power antenna with stability function as defined in claim 1, wherein the power supplying circuit is arranged for outputting the reference voltage and the driving voltage by controlling a second switching element in accordance with a state of the power supply controlling circuit after controlling operation of the power supply controlling circuit according to a first switching element.

4. The driving apparatus of a power antenna with a stability function as defined in claim 1, wherein the timer is arranged to provide hysteresis to the reference voltage for preventing an unstable output signal caused when a voltage drop of the driving voltage is generated when the driving state of the motor driving circuit is varied to control the operation of the motor.

5. The driving apparatus as defined in claim 1, wherein the operation time fixed by the timer corresponds to a time required to completely raise and lower the power antenna.

6. A driving apparatus of a power antenna with a stability function, comprising:

an antenna driving switch which drives the antenna by varying an operational state in accordance with selection by a user;

a motor;

a power supplying circuit which provides a reference voltage and a driving voltage needed for operation of the motor;

a timer which fixes an operation time for the motor according to the charging/discharging of a capacitor thereof, with respect to the operational state of the antenna driving switch, the timer being operatively connected with the antenna driving switch, the timer including:

a first resistor having one terminal connected to the driving voltage of the power supplying circuit and another terminal connected to a first reference voltage used for an antenna extension operation of the motor;

a second resistor having one terminal connected to another terminal of the first resistor and another terminal grounded;

a first transistor having an emitter terminal connected to the driving voltage of the power supplying circuit;

a third resistor having one terminal connected to the base terminal of the first transistor;

a second transistor having a collector terminal connected to another terminal of the third resistor, and an emitter terminal grounded;

a fourth resistor having one terminal connected to the collector terminal of the second transistor and another terminal connected to another terminal of the first resistor;

a third transistor having a collector terminal connected to another terminal of said first resistor;

a fifth resistor having one terminal connected to the emitter terminal of the third transistor and another terminal grounded;

a first comparator which compares a voltage of the capacitor to the first reference voltage used for the antenna extension operation of the motor and which outputs an extension time signal indicative of the comparison;

a second comparator which compares the voltage of the capacitor to a second reference voltage used for an antenna retraction operation of the motor and which outputs a retraction time signal indicative of the comparison;

a first inverter which inverts the state of the extension time signal;

a second inverter which inverts the state of the retraction time signal;

a first AND gate which performs an AND operation with the retraction time signal of the second comparator and an output of the first inverter; and a second AND gate which performs an AND operation with the extension time signal of the the first comparator and an output of the second inverter;

a motor driving circuit which controls the operation of the motor by setting a driving state in accordance with the operation time fixed by the timer, the motor driving circuit being operatively connected with the timer and with the motor;

an overload preventing circuit which outputs an overload signal for stopping operation of the motor when the motor is rotating, in case an overload is applied to the motor, by performing an integration and then finding that an integration result is above a fixed value, the overload preventing circuit being operatively connected with the motor driving circuit;

a latching circuit which controls the driving state of the motor driving circuit in accordance with the overload signal from the overload protecting circuit, the latching circuit being operatively connected with the overload protecting circuit; and a time-resetting circuit which varies the charging/discharging time of the timer according to the overload signal from the overload protecting circuit, the time-resetting circuit being operatively connected with the overload protecting circuit.

7. The driving apparatus of a power antenna with a stability function as defined in claim 6, wherein the timer is arranged to determine a maximum operating time for the antenna extending and retracting operations of the motor in accordance with operations of the first and second comparators and said capacitor according to the operational state of the antenna driving switch.

8. The driving apparatus as defined in claim 6, wherein the operation time fixed by the timer corresponds to a time required to completely raise and lower the power antenna.

9. A driving apparatus of a power antenna with a stability function, comprising:

an antenna driving switch which drives the antenna by varying an operational state in accordance with selection by a user;

a motor;

a power supplying circuit which provides a reference voltage and a driving voltage needed for operation of the motor;

a timer which fixes an operation time for the motor according to the charging/discharging of a capacitor thereof, with respect to the operational state of the antenna driving switch, the timer being operatively connected with the antenna driving switch;

a motor driving circuit which controls the operation of the motor by setting a driving state in accordance with the operation time fixed by the timer, the motor driving circuit being operatively connected with the timer and with the motor;

an overload preventing circuit which outputs an overload signal for stopping operation of the motor when the motor is rotating, in case an overload is applied to the motor, by performing an integration and then finding that an integration result is above a fixed value, the overload preventing circuit being operatively connected with the motor driving circuit and including:

a first resistor operatively connected to the motor driving circuit;

a second resistor having one terminal connected to one terminal of the first resistor;

a third resistor having one terminal connected to a source of electrical power;

a fourth resistor having one terminal connected to another terminal of the third resistor and another terminal grounded;

an operational amplifier having an inverting terminal connected to another terminal of the second resistor and a non-inverting terminal connected to another terminal of the third resistor;

a capacitor having one terminal connected to the inverting terminal of the operational amplifier and another terminal connected to an output terminal of the operational amplifier;

a fifth resistor having one terminal connected to the reference voltage of the power supplying circuit;

a sixth resistor having one terminal connected to another terminal of the fifth resistor;

a seventh resistor having one terminal connected to another terminal of the sixth resistor;

an eighth resistor having one terminal connected to another terminal of the seventh resistor and another terminal grounded;

a first comparator having an inverting terminal connected to one terminal of the seventh resistor and a non-inverting terminal connected to the output terminal of the operational amplifier;

a second comparator having a non-inverting terminal connected to one terminal of the sixth resistor and an inverting terminal connected to the output terminal of the operational amplifier; and a third comparator having an inverting terminal connected to one terminal of the eighth resistor and a non-inverting terminal connected to the output terminal of the operational amplifier;

a latching circuit which controls the driving state of the motor driving circuit in accordance with the overload signal from the overload protecting circuit, the latching circuit being operatively connected with the overload protecting circuit; and a time-resetting circuit which varies the charging/discharging time of the timer according to the overload signal from the overload protecting circuit, the time-resetting circuit being operatively connected with the overload protecting circuit.

10. The driving apparatus as defined in claim 9, wherein the operation time fixed by the timer corresponds to a time required to completely raise and lower the power antenna.

11. A driving apparatus of a power antenna with a stability function, comprising:

an antenna driving switch which drives the antenna by varying an operational state in accordance with selection by a user;

a motor;

a power supplying circuit which provides a reference voltage and a driving voltage needed for operation of the motor;

a timer which fixes an operation time for the motor according to the charging/discharging of a capacitor thereof, with respect to the operational state of the antenna driving switch, the timer being operatively connected with the antenna driving switch;

a motor driving circuit which controls the operation of the motor by setting a driving state in accordance with the operation time fixed by the timer, the motor driving circuit being operatively connected with the timer and with the motor;

an overload preventing circuit which outputs an overload signal for stopping operation of the motor when the motor is rotating, in case an overload is applied to the motor, by performing an integration and then finding that an integration result is above a fixed value, the overload preventing circuit being operatively connected with the motor driving circuit;

a latching circuit which controls the driving state of the motor driving circuit in accordance with the overload signal from the overload protecting circuit, the latching circuit being operatively connected with the overload protecting circuit and including:

a first latch circuit which is arranged to stop a supply of power by said power supplying circuit by receiving said overload signal of said overload protecting circuit, to stop operation of the motor driving circuit, to vary a maximum operating time of the antenna by varying a state of a voltage of the capacitor of the timer in accordance with the driving state of the motor driving circuit during an antenna extending operation of the motor, and by varying the voltage state of the capacitor of the timer in accordance with the driving state of the motor driving circuit during an antenna retracting operation of the motor; and a second latch circuit which is arranged to output a controlling signal to stop operation of the motor driving circuit and to prevent incorrect operation of the motor due to overload until the output of the overload sensing circuit is returned to a normal state by inputting the overload signal; and a time-resetting circuit which varies the charging/discharging time of the timer according to the overload signal from the overload protecting circuit, the time-resetting circuit being operatively connected with the overload protecting circuit.

12. The driving apparatus as defined in claim 11, wherein the operation time fixed by the timer corresponds to a time required to completely raise and lower the power antenna.

13. A circuit for driving a motor adapted to raise and lower a power antenna, comprising:

a switch having a first switch state corresponding to an antenna raising operation and a second switch state corresponding to an antenna lowering operation;

a power supplying circuit that generates a driving voltage;

a timer circuit coupled to said switch and said power supplying circuit that sets a first and second motor activation period in accordance with said first and second switch states, respectively, and which outputs first and second controlling signals, respectively, during said first and second motor activation periods, said timer circuit including a stabilization circuit that maintains said first and second controlling signals even when said driving voltage is unstable;

a detecting circuit that detects an overload condition in said motor and outputs an overload signal indicative thereof;

a latching circuit coupled to said detecting circuit that receives said overload signal and outputs a stop signal in response thereto;

a driving circuit coupled to said timer circuit that controls application of power to said motor during said first and second motor activation periods, said driving circuit also being coupled to receive said stop signal from said latching circuit and to halt application of power to said motor in response thereto.

14. A circuit as defined in claim 13, further comprising:

a time-resetting circuit coupled to said timer circuit and said latching circuit that shortens said first and second motor activation periods in response to said stop signal.

15. A circuit as defined in claim 13, wherein said detecting circuit also detects a full operating power condition of said motor and outputs a normal power signal to said latching circuit, said latching circuit outputting a start signal to said driving circuit in response thereto, said driving circuit being coupled to receive said start signal and to prevent application of power to said motor during said first and second motor activation periods until said start signal is received.

16. A circuit as defined in claim 13, wherein the power supplying circuit is arranged to detect said first and second motor activation periods and to minimize power consumption by controlling the supply of said driving voltage in accordance therewith.

* * * * *